US012680809B2

(12) United States Patent
    Kabetani et al.

(10) Patent No.: US 12,680,809 B2
(45) Date of Patent: Jul. 14, 2026

(54) OPTICAL INTERFERENCE MEASUREMENT DEVICE

(71) Applicant: Panasonic Intellectual Property Management Co., Ltd., Osaka (JP)

(72) Inventors: Yasuhiro Kabetani, Osaka (JP); Takashi Urashima, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 134 days.

(21) Appl. No.: 18/916,775

(22) Filed: Oct. 16, 2024

(65) Prior Publication Data

US 2025/0035427 A1     Jan. 30, 2025

Related U.S. Application Data

(63) Continuation of application No. PCT/JP2023/005270, filed on Feb. 15, 2023.

(30) Foreign Application Priority Data

Apr. 27, 2022     (JP) ................................. 2022-073302

(51) Int. Cl.
    *G01B 9/02091*        (2022.01)

(52) U.S. Cl.
    CPC ...... *G01B 9/02091* (2013.01); *G01B 2290/25* (2013.01)

(58) Field of Classification Search
    CPC .............. G01B 9/0209; G01B 2290/25; G01B 11/2441; G01B 9/02044; G01B 9/02008;
                    (Continued)

(56) References Cited

U.S. PATENT DOCUMENTS

2011/0181889 A1*   7/2011   Kabetani ............ G01B 9/02078
                                                    356/496
2011/0299035 A1   12/2011   Suehira
                    (Continued)

FOREIGN PATENT DOCUMENTS

CN          104729424 B   * 10/2017
CN          113587844 A   * 11/2021   ......... G01B 11/2441
                    (Continued)

OTHER PUBLICATIONS

International Search Report of PCT application No. PCT/JP2023/005270 dated Mar. 20, 2023.
                    (Continued)

*Primary Examiner* — Michael P Stafira
(74) *Attorney, Agent, or Firm* — Wenderoth, Lind & Ponack, L.L.P.

(57)                ABSTRACT

When light adjusted at equal frequency intervals by optical comb generation filter 205 is incident and emitted from measurement head 207 to measurement target W, the light adjusted at equal frequency intervals by optical comb generation filter 205 is divided into measurement light and reference light by light division unit 208, and interference light in which reflected light of the measurement light from measurement target W and the reference light are multiplexed is detected by interference light detection unit 210.

5 Claims, 8 Drawing Sheets

(58) Field of Classification Search
    CPC .. G01B 9/02; G01B 9/02049; G01B 9/02004;
            G01B 9/02015; G01B 9/021; G01B
            9/023; G01B 11/161; G01B 2290/35;
            G01B 2290/70; G01B 9/02024; G01B
            9/02028; G01B 9/02039; G01B 9/02045;
            G01B 9/02082; G01B 9/02091; G01B
            2210/50; G01B 2290/30; G01B 9/02007;
            G01B 9/02022; G01B 9/02036; G01B
            9/02042; G01B 9/02057; G01B 9/02097;
            G01B 11/02; G01B 11/162; G01B 11/26;
            G01B 2290/60; G01B 9/02001; G01B
            9/02002; G01B 9/02003; G01B 9/02038;
            G01B 9/02055; G01B 9/02059; G01B
            9/02071; G01B 9/02075; G01B 9/02083
    See application file for complete search history.

(56)                References Cited

U.S. PATENT DOCUMENTS

| | | | | |
|---|---|---|---|---|
| 2013/0063728 A1 * | 3/2013 | Kuramoto | .......... | G01B 9/02008 |
| | | | | 356/484 |
| 2017/0224219 A1 | 8/2017 | Hirayama et al. | | |
| 2022/0206164 A1 * | 6/2022 | Takada | .................. | G01S 7/4911 |

FOREIGN PATENT DOCUMENTS

| | | | | | |
|---|---|---|---|---|---|
| DE | 10207186 | C1 * | 4/2003 | ......... | G01N 21/4795 |
| DE | 202014101699 | U1 * | 7/2014 | ......... | G01B 9/02007 |
| EP | 3176589 | A1 * | 6/2017 | ............. | G01Q 20/02 |
| EP | 3205260 | A2 * | 8/2017 | ......... | G01B 9/02004 |
| EP | 3657203 | A1 * | 5/2020 | ............. | G01S 7/497 |
| JP | 2004-340581 | | 12/2004 | | |
| JP | 2009-270939 | | 11/2009 | | |
| JP | 2011095197 | A * | 5/2011 | | |
| JP | 2011-257160 | | 12/2011 | | |
| JP | 2013-029317 | | 2/2013 | | |
| JP | 2015-137996 | | 7/2015 | | |
| JP | 2015137996 | A * | 7/2015 | | |
| JP | 2017049117 | A * | 3/2017 | | |
| JP | 2017-078677 | | 4/2017 | | |
| JP | 2017-181300 | | 10/2017 | | |
| JP | 2019-512086 | | 5/2019 | | |
| JP | 6925550 | B1 * | 8/2021 | .......... | G01B 11/026 |
| KR | 101746693 | B1 * | 6/2017 | ............. | G02B 26/10 |
| WO | 2016/067570 | | 5/2016 | | |
| WO | 2017/139760 | | 8/2017 | | |
| WO | WO-2018102915 | A1 * | 6/2018 | ......... | G01B 9/02008 |

OTHER PUBLICATIONS

Choi, Samuel et al., Multifrequency swept common-path en-face OCT for wide-field measurement of interior surface vibrations in thick biological tissues, Optics Express. Aug. 4, 2015, vol. 23, No. 16, pp. 21078-21089. <DOI:10.1364/OE.23.021078> see in particular, "2.1 Interferometry of multifrequency swept OCT", "3.1 Experimental setup", "3.2 En-face OCT measurement", fig. 1. 3. 5. 6. etc.

\* cited by examiner

BODY

LD DRIVE
CIRCUIT

SLD DRIVE
CIRCUIT

12

40

SPECTROSCOPIC
DEVICE

30

L

W

OPTICAL INTERFERENCE MEASUREMENT DEVICE

TECHNICAL FIELD

The present invention relates to an optical interference measurement device that measures a measurement target using interference light between reflected light and reference light.

BACKGROUND ART

Optical coherence tomography (that is, OCT) is a tomographic imaging method for a structure such as a coating film or a living body using a light interference phenomenon. OCT has already been put to practical use in the field of ophthalmology, and has been used for tomographic imaging of a fine region such as a retina in an eyeball as a tomographic measurement method having a high resolution of several tens of micrometers.

There are two types of OCT: a time domain OCT that requires scanning of a reference plane (that is, TD-OCT) and a frequency domain OCT that does not require scanning of a reference plane (that is, FD-OCT). There are two types of FD-OCT, namely, a spectrometer type (that is, SD-OCT) and a wavelength scanning type light source type (that is, SS-OCT). Both of them divide light emitted from a light source into measurement light and reference light, then multiplex the measurement light and the reference light reflected from a measurement target, and acquire an optical tomographic image based on a beat frequency of interference light between the measurement light and the reference light.

Figure 8:
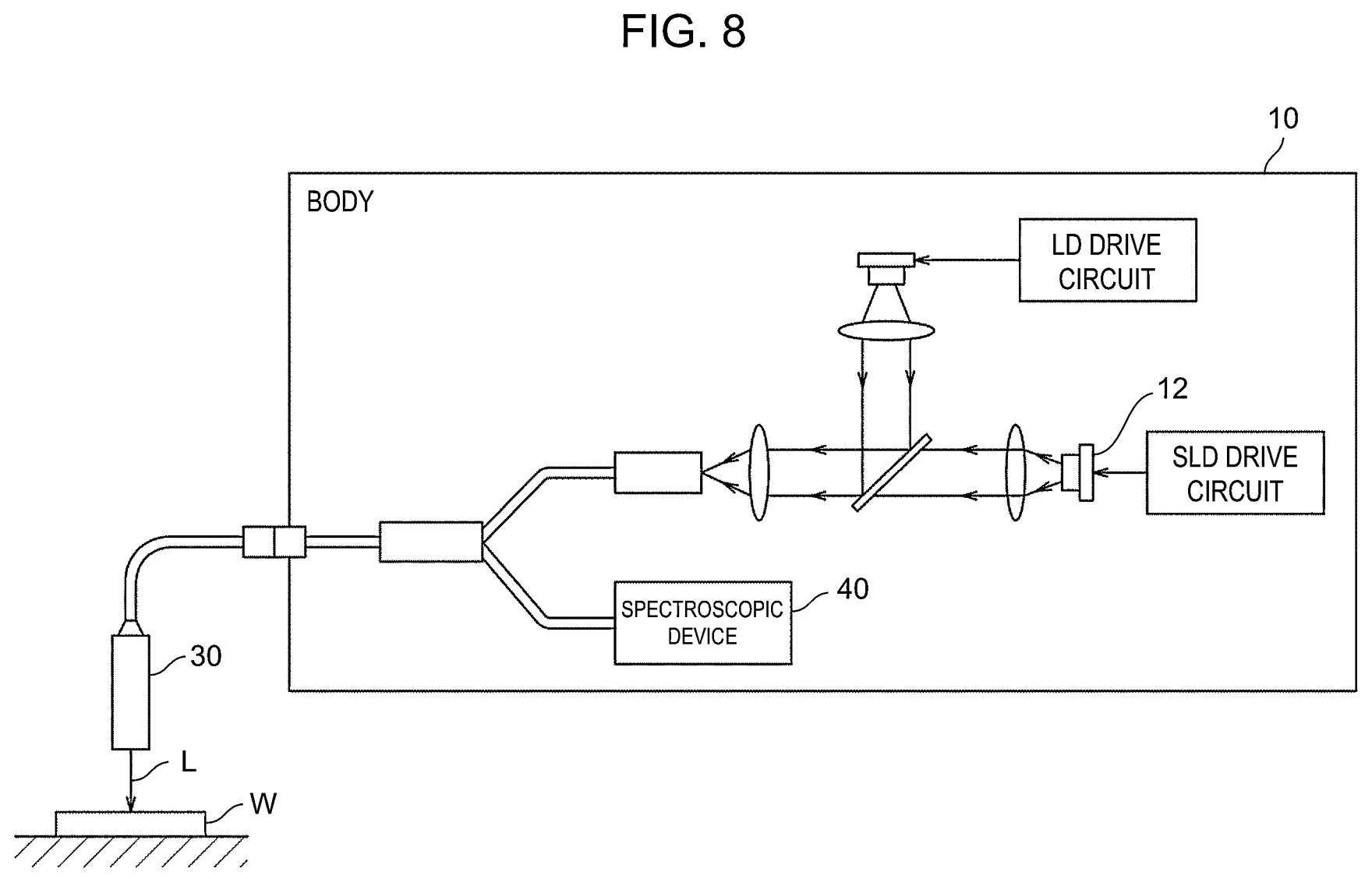

FIG. 8 is a diagram illustrating a conventional SD-OCT device described in PTL 1.

In interferometer 10 in the device illustrated in FIG. 8, the light emitted from light source 12 is divided into reference light and measurement light at an end surface of collimator 30, the reference light is directly incident on spectroscopic device 40, and the measurement light is reflected from measurement target W and then also incident on spectroscopic device 40 via collimator 30. Here, the end surface of collimator 30 operates as a reference surface in the optical interferometer.

In spectroscopic device 40, the measurement light and the reference light interfere with each other in the spectral region, and as a result, interference fringes are measured as interference signals. Performing appropriate signal processing on this interference signal makes it possible to obtain differentiation of a one-dimensional refractive index distribution in a depth direction of measurement target W, that is, a reflectance distribution, that is, an optical tomographic image.

In this manner, the branching portion between the reference light and the measurement light is provided not in interferometer 10 but in the vicinity of measurement target W, in this case, on an end surface of collimator 30 on the measurement target W side. An optical system in which the reference light and the measurement light pass through almost the same optical path is called a common path optical system, and since the reference light and the measurement light share and cancel each other a disturbance such as a variation in an optical path length due to wavelength dispersion or thermal expansion, the common path optical system has high accuracy.

CITATION LIST

Patent Literature

PTL 1: Unexamined Japanese Patent Publication No. 2009-270939

SUMMARY OF THE INVENTION

An optical interference measurement device according to one aspect of the present invention includes:

an optical division unit that divides light into measurement light and reference light, the light being emitted from a low coherence light source and adjusted at equal frequency intervals; and an interference light detection unit that detects interference light in which reflected light from a measurement target and the reference light are multiplexed, wherein a distance from a zero point to the measurement target is set within a range from a first distance to a second distance, the zero point is a point at which a signal optical path length of signal light that is the measurement light coincides with a reference optical path length of the reference light, the first distance is obtained by subtracting a measurable range determined by an optical frequency resolution of the interference light detection unit from a first value that is an integer multiple of a second value obtained by multiplying a reciprocal of a mode interval of an optical comb generation filter by a light speed, and the second distance is obtained by adding the measurable range to the first value.

BRIEF DESCRIPTION OF THE DRAWINGS

FIG. 8 is a diagram illustrating a conventional SD-OCT device described in PTL 1.

DESCRIPTION OF EMBODIMENT

Measurable range LD in a depth direction that can be measured in the SD-OCT device, that is, half of the maximum value of the optical path length difference between the reference light and the measurement light that can correctly obtain the spectral interference fringes is limited by the optical frequency resolution of the spectrometer. Thus, in the conventional configuration, there is a problem that distance L to measurement target W based on the end surface on measurement target W side of collimator 30, which is the branching portion between the reference light and the measurement light, cannot be made larger than measurable range LD, and only the measurement in which collimator 30 is brought close to measurement target W can be performed.

The present invention solves the above-described conventional problem, and an object of the present invention is to provide an optical interference measurement device capable of measuring a target positioned farther than a measurable range while maintaining high accuracy.

Hereinafter, an exemplary embodiment of the present invention will be described with reference to the drawings.

First Exemplary Embodiment

Figure 1:
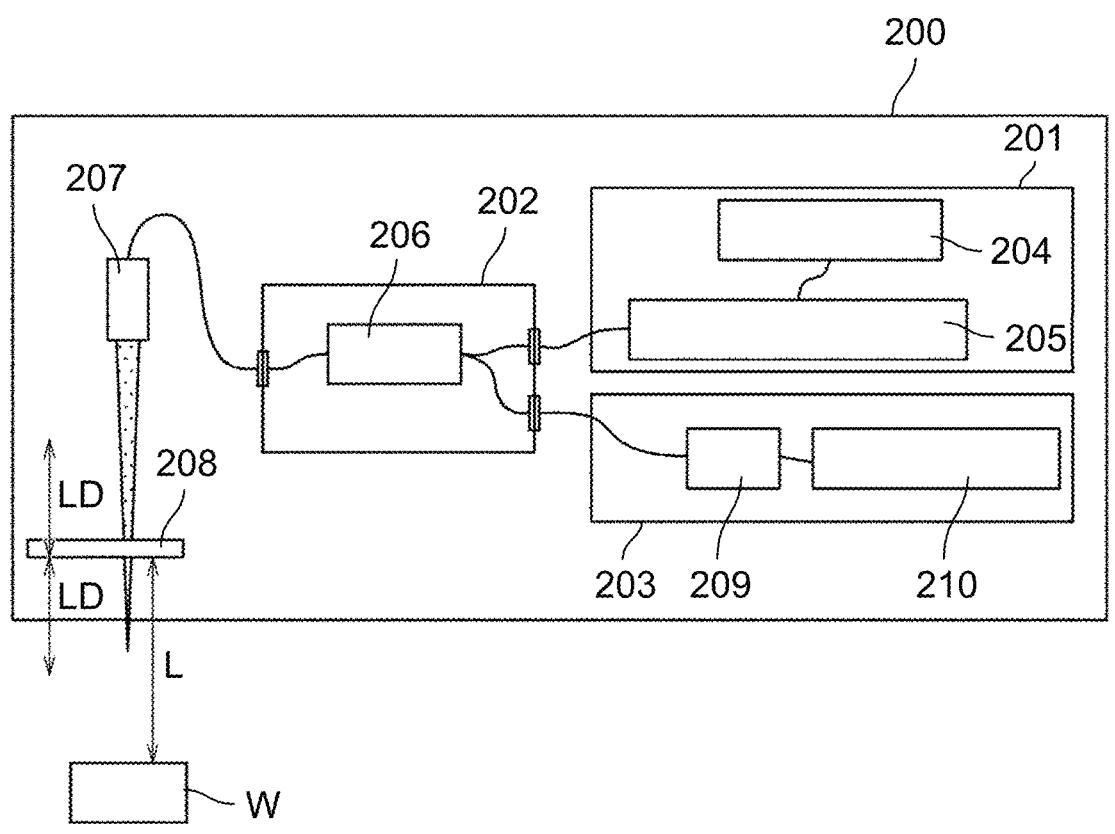
FIG. 1 is a diagram illustrating an overall configuration of an SD-OCT device according to a first exemplary embodiment.

FIG. 1 is a diagram illustrating an overall configuration of an SD-OCT (spectrometer type optical coherence tomography) device 200 as an example of an optical interference measurement device in a first exemplary embodiment.

SD-OCT device 200 includes at least optical frequency comb light source 201 having low coherence light source 204 and optical comb generation filter 205, an optical division unit, and an interference light detection unit. In FIG. 1, SD-OCT device 200 further includes optical fiber interferometer 202 and spectrometer 203 having an interference light detection unit.

Optical frequency comb light source 201 is a light source having an optical frequency distribution at equal intervals. Optical frequency comb light source 201 includes low coherence light source 204 such as a super luminescent diode (SLD), an ultrashort pulse laser, or a super continuum light source, and optical comb generation filter 205 that adjusts low coherence light emitted from low coherence light source 204 to an equal optical frequency distribution. The optical frequency of the light emitted from low coherence light source 204 is formed into an optical frequency distribution at equal intervals, that is, a comb shape at equal frequency intervals by optical comb generation filter 205. Details of the optical frequency to be formed will be described later.

The light generated from optical frequency comb light source 201 enters optical fiber interferometer 202. Optical fiber interferometer 202 includes coupler 206 connected to two light receiving ports and one light sending port.

In optical fiber interferometer 202, the light emission port of optical frequency comb light source 201 is connected to a first light receiving port of the two light receiving ports of coupler 206. The light sending port of coupler 206 is connected to measurement head 207 outside optical fiber interferometer 202. Light adjusted at equal frequency intervals by optical comb generation filter 205 is incident on measurement head 207 and emitted toward measurement target W.

The light emitted from measurement head 207 is divided into measurement light and reference light by reference surface 208 as an example of a light division unit. Reference surface 208 is disposed at a position away from measurement head 207 toward measurement target W, in other words, at a position away from measurement target W by distance L, in the space between measurement head 207 and measurement target W, instead of the end surface of collimator 30 on measurement target W side like in the conventional case.

Reference surface 208 in the first exemplary embodiment is made of a material capable of separating light into transmitted light and reflected light. As an example, a half mirror, a parallel flat plate made of glass, or the like can be used.

The reference light enters coupler 206 from reference surface 208 via measurement head 207, and enters spectrometer 203 from the second light receiving port of the two light receiving ports of coupler 206. On the other hand, the measurement light is emitted from reference surface 208 to measurement target W separated by distance L to measurement target W, returns to reference surface 208 through reflection or scattering in measurement target W, enters coupler 206 through measurement head 207 in the same manner as the reference light, and enters spectrometer 203 through the second light receiving port of coupler 206.

In interferometer 202, a point at which the signal optical path of the measurement light coincides with the reference optical path of the reference light is referred to as a zero point. The zero point in interferometer 202 is the position of reference surface 208 itself, but the present invention is not limited to this configuration in the case of an interferometer of a different disposition such as the Michelson type.

Spectrometer 203 includes diffraction grating 209 connected to interferometer 202 and detector array 210 connected to diffraction grating 209. The two pieces of light of the measurement light and the reference light are simultaneously dispersed by diffraction grating 209 of spectrometer 203, and interfere in the optical frequency domain to become interference light in which reflected light and the reference light are multiplexed. As a result, an interference signal of the interference light is measured by detector array 210 as an example of the interference light detection unit.

Performing appropriate signal processing on this interference signal makes it possible to obtain differentiation of a one-dimensional refractive index distribution in the signal optical path of the measurement light of measurement target W, that is, a reflectance distribution. Here, it is defined that the positive and negative signs of the optical path length difference are determined by the positive and negative of the calculation result of the signal optical path length—the reference optical path length.

At this time, as described above, when the finite measurable range in the depth direction that can be measured by SD-OCT device 200 is denoted by LD, the measurable maximum range is a range of $\pm$LD centered on the zero point. Assuming that the optical frequency that can be resolved by one pixel of detector array 210 is frequency resolution dv, the maximum time difference between the measurement light and the reference light observed by spectrometer 203 is $\frac{1}{2}$ dv according to the Nyquist sampling theorem. This means that, when converted to a depth, that is, a reciprocating distance, $$LD = c/4dv \qquad (1)$$

forms where c is a light speed, in which measurable range LD is larger as frequency resolution dv of spectrometer 203 is better, but there is a limit because frequency resolution dv is limited by the finite number of pixels of detector array 210.

5

6

<Optical Frequency Comb Generator>

Figure 2A:
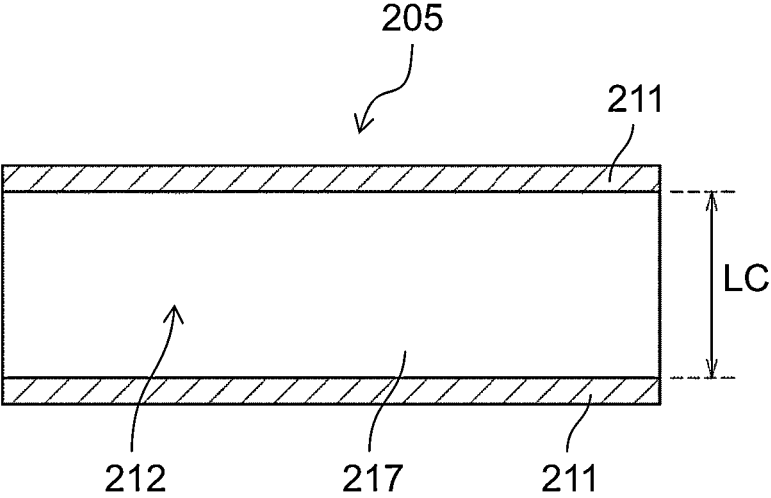
FIG. 2A is a diagram of a Fabry-Perot filter in the first exemplary embodiment.

An output spectrum generated by optical frequency comb light source 201 which is an optical frequency comb generator will be described with reference to FIGS. 2A to 2D. As an example, optical comb generation filter 205 is Fabry-Perot filter 212 constituting an optical resonator in which a pair of half mirrors 211 having reflectance R as illustrated in FIG. 2A is disposed to face each other across air gap 217 having a constant air gap distance, that is, cavity length LC. To the output of low coherence light source 204 that has passed through optical comb generation filter 205, in the time domain, a time delay of $$2LC/c \times n \qquad (2)$$

is added. n is the number of reciprocations of light in the optical resonator, and n is 0, 1, 2, or 3.

Figure 2B:
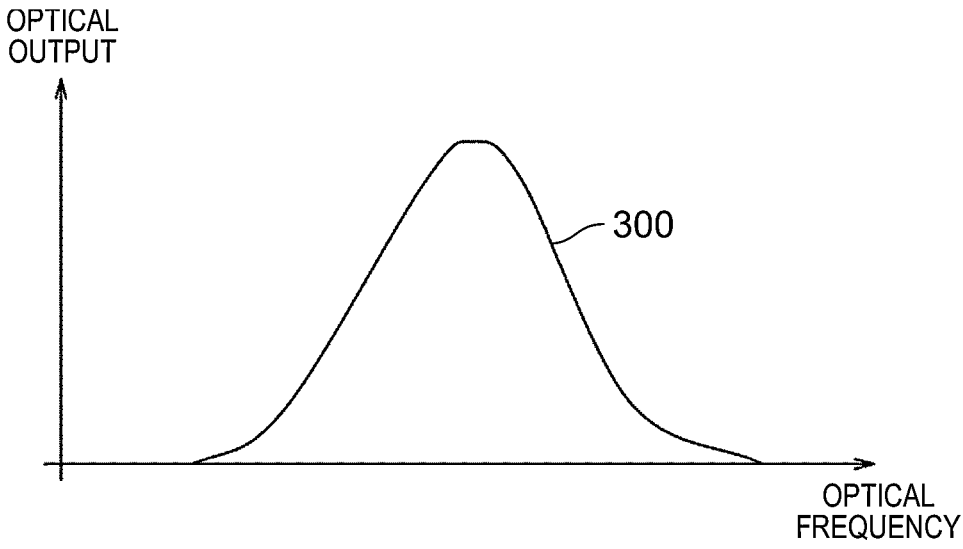
FIG. 2B is a diagram illustrating an optical output of an optical frequency comb light source in a frequency domain.
Figure 2C:
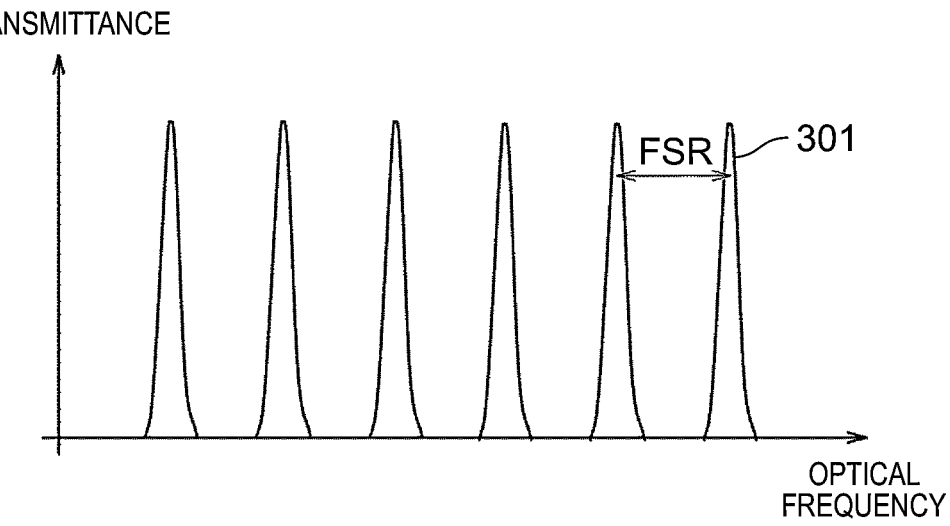
FIG. 2C is a diagram illustrating transmittance of an optical frequency comb light source in a frequency domain.
Figure 2D:
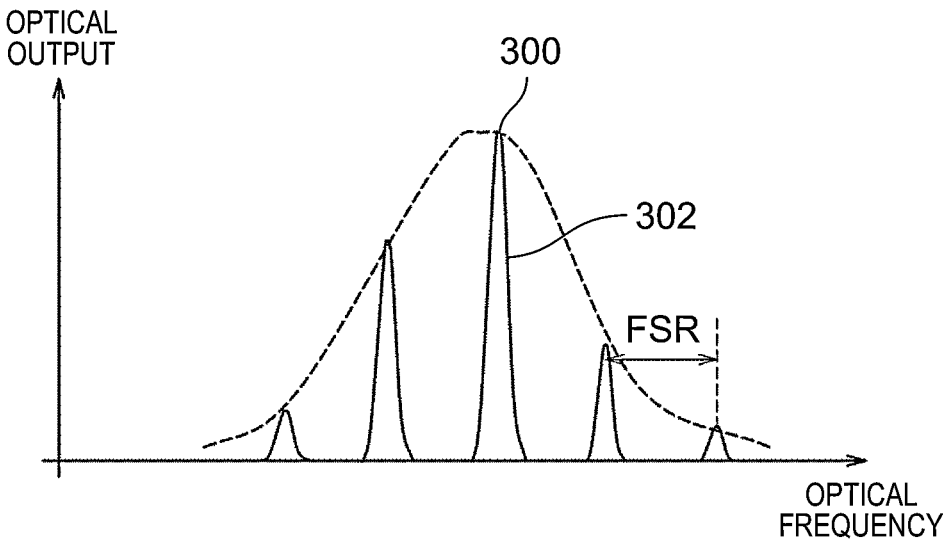
FIG. 2D is a diagram illustrating an optical output of an optical frequency comb light source in a frequency domain.

FIGS. 2B to 2D illustrate the output of optical frequency comb light source 201 in the frequency domain. In FIGS. 2B to 2D, the vertical axis represents light output, transmittance, and light output, and the horizontal axis represents optical frequency.

In optical comb generation filter 205, spectrum 300 (see FIG. 2B) of original low coherence light source 204 is multiplied by transmittance spectrum 301 (see FIG. 2C) of optical comb generation filter 205, and adjusted to comb-like output spectrum 302 (see FIG. 2D) in which the mode of equal mode interval FSR stands.

Mode interval FSR at this time is represented by $$FSR = c/2LC \qquad (3)$$

using light speed c and cavity length LC.

Here, optical frequency comb light source 201 does not have to be a combination of low coherence light source 204 and optical comb generation filter 205, but it may be a mode-locked laser in which a repetition frequency is stabilized, a mode in which a single mode laser is modulated by an electro-optical element to form a comb-like mode, or a high-finesse etalon. However, with these light sources, a line width of a single mode in an output spectrum is a narrow band, as a result, a coherence length defined by the line width of the single mode of optical frequency comb light source 201 is increased to several tens meters to more than or equal to 100 m. Specifically, when the line width of the single mode is Δf, coherence time T of the single mode is expressed as follows.

$$T = 1/\Delta f \qquad (4)$$

Coherence length CO based on coherence time T is converted into a depth and expressed as follows.

$$CO = T * c/2 = c/2\Delta f \qquad (5)$$

For example, in the case of a high-fineness etalon having FSR=10 GHz and finesse of about 2000, coherence length CO is as long as about 30 m, and thus, for example, backscattered light generated in an optical element such as coupler 206 interferes with the reference light from reference surface 208, and there is a problem that the S/N ratio is lowered as an unnecessary interference signal. In addition, the high fineness etalon has low light transmittance, and it is difficult to obtain light intensity satisfying the measurement dynamic range of spectrometer 203 as compared with a case where the output of low coherence light source 204 is used as it is.

Thus, a Fabry-Perot filter is preferable in which the coherence length of the single mode of optical frequency comb light source 201 can be controlled to be more than or equal to twice and less than or equal to 20 times distance L from the zero point to measurement target W. When the coherence length is less than twice distance L, a sufficient interference signal cannot be obtained when the measurement range is expanded twice, as described later. When the coherence length exceeds 20 times distance L, the S/N ratio is lowered as described above, and the transmittance of light is further lowered.

To realize this, the line width of the peak of the maximum value of the transmittance of Fabry-Perot filter 212 is ½ to ¹⁄₂₀ of mode interval FSR. This can be realized by setting reflectance R of the pair of half mirrors 211 constituting Fabry-Perot filter 212 to 20% and 85%, respectively.

Thus, it is preferable that optical comb generation filter 205 is Fabry-Perot filter 212 in the range of the finesse from 2 to 20, and mode interval FSR is a mechanism to be randomly modulated as described later.

Here, coupler 206 is used for light multiplexing, but optical fiber interferometer 202 may be constructed in a free space using a beam splitter or may be substituted by using an element such as an optical circulator.

Optical comb generation filter 205 that adjusts the spectrum of low coherence light source 204 does not have to be a resonator using air gap 217 like Fabry-Perot filter 212, but it may be a resonator time delay mechanism using a fiber resonator.

First Modification of Optical Comb Generation Filter 205

Figure 3:
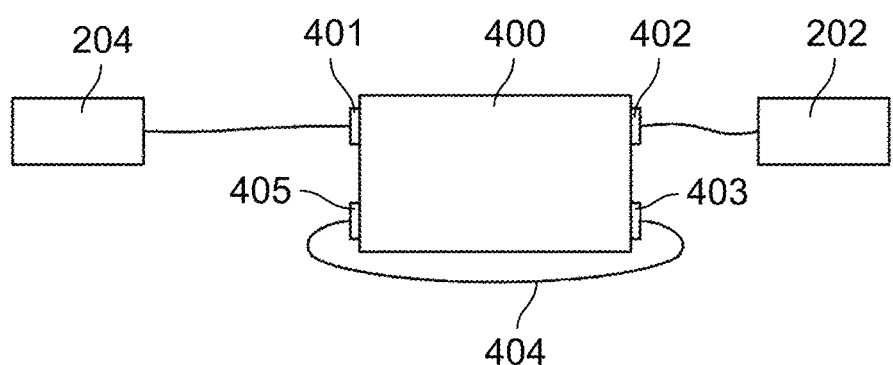
FIG. 3 is a diagram of a modification of an optical comb generation filter.

FIG. 3 is an explanatory diagram illustrating a first modification of optical comb generation filter 205 according to the first exemplary embodiment. The first modification of optical comb generation filter 205 is resonator coupler 400 including first input port 401, second input port 405, and two output ports 402, 403.

The output of low coherence light source 204 is incident on first input port 401 of resonator coupler 400. The incident light is branched into two output ports 402, 403 by resonator coupler 400, and the output of first output port 402 is incident on optical fiber interferometer 202.

The output of second output port 403 is connected to second input port 405 of resonator coupler 400 via time delay fiber 404 having optical path length LF.

With this configuration, a time delay corresponding to the optical path length of time delay fiber 404 can be provided in the output of low coherence light source 204. This time delay corresponds to optical resonators disposed to face each other with a cavity length LC/2.

In the first modification, particularly when a long time delay is provided, it is not necessary to perform precise alignment as compared with a resonator using air gap 217 such as Fabry-Perot filter 212, and adjustment is easy.

<Extension of Depth Range>

Figure 4:
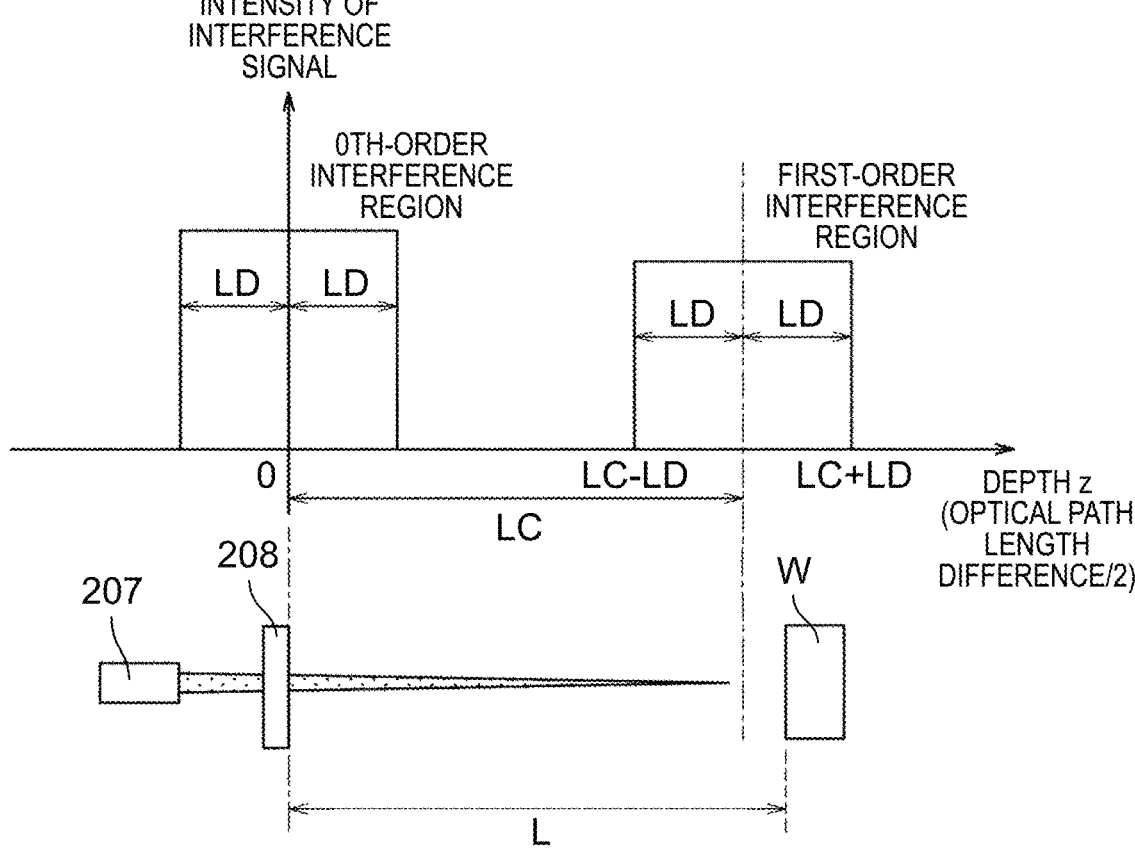
FIG. 4 is a diagram of a coherence region of the SD-OCT device in the first exemplary embodiment.

FIG. 4 illustrates a coherence region of SD-OCT device 200 according to the first exemplary embodiment. Here, a range of the optical path length difference in which the interference signal can be obtained is referred to as a coherence region. In the coherence region, when the vertical axis represents the intensity of the interference signal and the horizontal axis represents depth z (=optical path length difference/2), a Lorentz function centered on the zero point is drawn, but here, for simplicity, the intensity of the interference signal is constant, and the width is a rectangle of ±LD.

In the vicinity of the zero point where the optical path length difference between the signal optical path and the reference optical path is 0, an interference signal is detected in the range of the optical path length difference 0±LD. This is defined as a 0th-order coherence region.

Further, when the optical path length difference between the signal optical path and the reference optical path is further separated by +2LC, that is, when depth z is separated by +LC, the interference signal can be obtained even in the region of the depth LC±LD. When considered in the time domain, it can be considered that the light having a time delay of $2LC/c×(n+1)$ and the light having a time delay of $2LC/c×n$ because of optical comb generation filter 205 cancel each time difference with the time difference of $2LC/c$ between the zero point and measurement target W and interfere with each other.

Also when the optical path length difference between signal optical path and the reference optical path is further separated by +2LC, an interference signal can be obtained in the same manner in the region of depth 2LC±LD.

In this manner, interference occurring in a region separated from the zero point by a depth $n×LC$ (where n=1, 2, 3 . . . ) is referred to as nth-order interference.

Thus, in the first exemplary embodiment, it is possible to obtain an interference signal when distance L between the zero point and measurement target W is larger than measurable range LD by using the interference of the nth order (where n=1, 2, 3 . . . ).

As the range of n, an interference signal can be obtained regardless of the value as long as the range is a coherence length defined by the line width of the single mode of optical frequency comb light source 201, but the intensity of the interference signal of the first order is strong next to the 0th order, and thus n=first order is preferable. That is, as the range of cavity length LC, cavity length LC is preferably set in such a manner that distance L from the zero point to measurement target W falls within the range of the following expression.

$$LC \times 1 - LD < L < LC \times 1 + LD \qquad (6)$$

However, when cavity length LC is increased, the resonator length in optical comb generation filter 205 becomes long, and thus, there is no problem to use interference of more than or equal to n=second order in the range of the coherence length defined by the line width of the single mode of optical frequency comb light source 201.

When Formula (6) is expressed in other words, from $LC=1/(2FSR)*c$ in Formula (3), the distance L from the zero point at which the signal optical path length of the signal light as the measurement light and the reference optical path length of the reference light coincide with each other to the measurement target W is preferably within a range from a distance ($[1/(2FSR)*c*n]–LD$) obtained by subtracting measurable range LD determined by optical frequency resolution dv of spectrometer 203 from a value that is an integral multiple (where n=1, 2, 3 . . . ) of a value obtained by dividing a reciprocal of mode interval FSR of optical comb generation filter 205 by 2 and multiplying the light speed c (that is, $1/(2FSR)*c*n$) to a distance ($[1/(2FSR)*c*n]+LD$) obtained by adding measurable range LD to the value (that is, $1/(2FSR)*c*n$).

<Adjustment Mechanism for Signal Light Intensity>

To obtain an interference signal with good contrast within a finite dynamic range of detector array 210 in SD-OCT device 200, it is desirable that the intensity of the signal light which is the measurement light and the intensity of the reference light become equal. However, in the common path interferometer, the reference light always passes through the same optical path as the signal light, and it is difficult to adjust the intensity of only the reference light. Thus, intensity adjustment mechanism 213 may be provided in measurement head 207 on the signal light side between the zero point and measurement target W.

Figure 5:
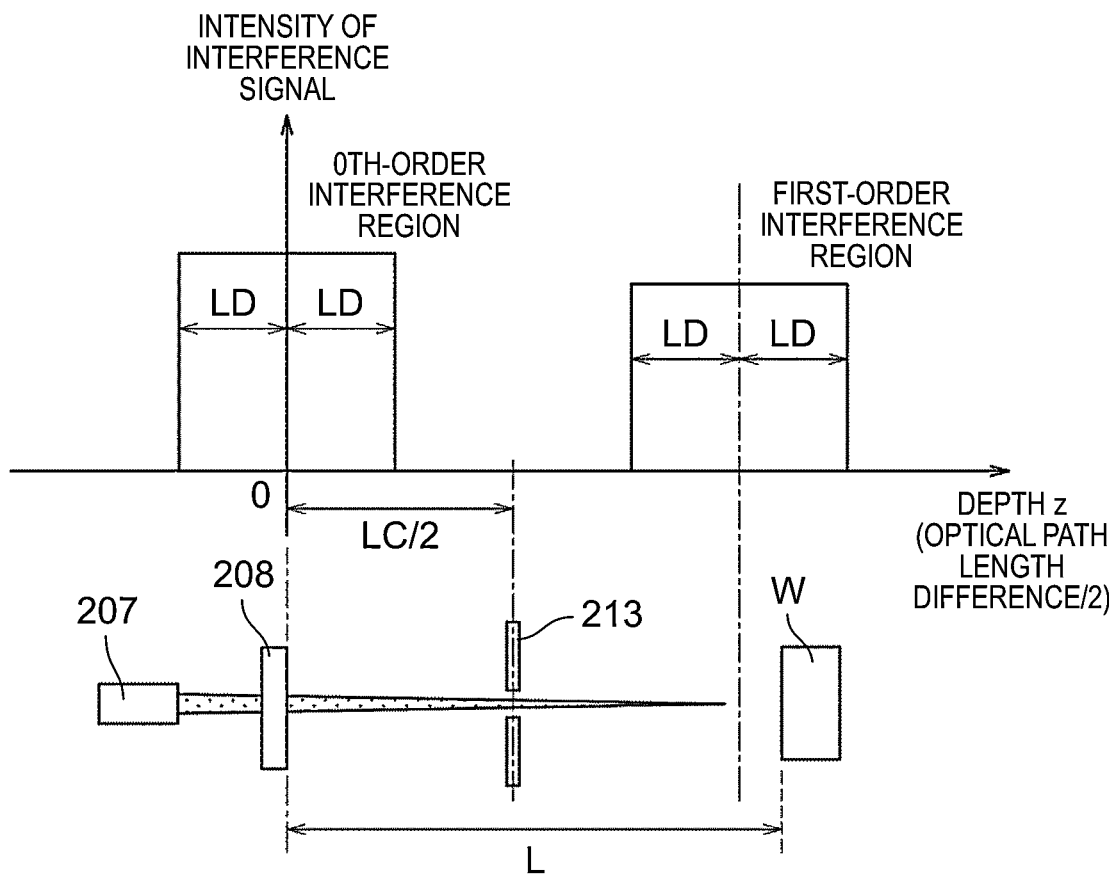
FIG. 5 is a diagram illustrating an installation position of an intensity adjustment mechanism.

FIG. 5 illustrates a diagram of measurement head 207 provided with intensity adjustment mechanism 213 and the coherence region. Intensity adjustment mechanism 213 is, for example, an element such as an aperture whose aperture can be changed or a variable neutral density (ND) filter, and by adjusting the intensity of only the reference light, the intensity of the signal light and the intensity of the reference light become equal, and an interference signal with good contrast can be obtained.

To prevent the reflection of the element end surface from being detected as an interference signal, intensity adjustment mechanism 213 is installed at a position of a depth +LC/2 from the zero point, which is an intermediate between the 0th-order interference region and the first-order interference region, in other words, at a position at a distance of ¼ of a value obtained by multiplying the reciprocal of mode interval FSR of optical comb generation filter 205 by light speed c from the zero point.

This allows intensity adjustment mechanism 213 to minimize contribution of the generated backscattered light to the interference signal.

In the same manner, a region that is not detected as an interference signal also occurs at a depth –LC/2, which is an intermediate between the interference region of the 0th order and the interference region of the first order. However, in such a region where the optical path difference is negative, the signal light and the reference light do not reach reference surface 208 and pass through the same optical path. Thus, it is not preferable to install intensity adjustment mechanism 213 in such a region.

<Discrete Prevention of Spectrometer>

Figure 6A:
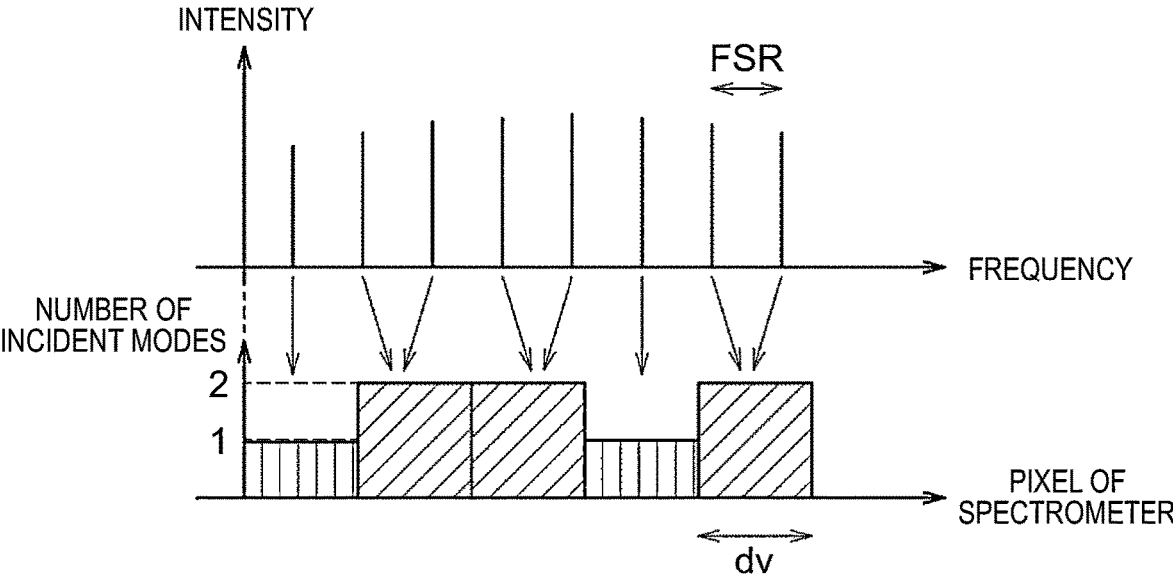
FIG. 6A is a diagram illustrating variation in the number of incident modes with respect to a detector array.

When the spectrum generated by optical frequency comb light source 201 is incident on detector array 210 of spectrometer 203, the number of modes incident on one pixel of detector array 210 varies due to a quantization error. FIG. 6A illustrates the variation in the number of incident modes with respect to detector array 210. For example, assuming that the center wavelength of 1310 nm and the wavelength width of 100 nm are uniformly dispersed by a spectrometer of 1024 pixel, frequency resolution dv per pixel of detector array 210 is 17 GHz. At this time, when mode interval FSR of optical comb generation filter 205 is 17 GHz as with frequency resolution dv, the number of modes incident per pixel is fixed at one, but for example, when mode interval FSR is 10 GHZ, the number of modes incident per pixel is one or two. This variation results in intensity variation of each pixel, which causes degradation of the S/N ratio of SD-OCT device 200.

To prevent this, optical comb generation filter 205 modulates mode interval FSR within the exposure time of detector array 210, thereby reducing the influence of the variation in the number of incident modes.

Figure 6B:
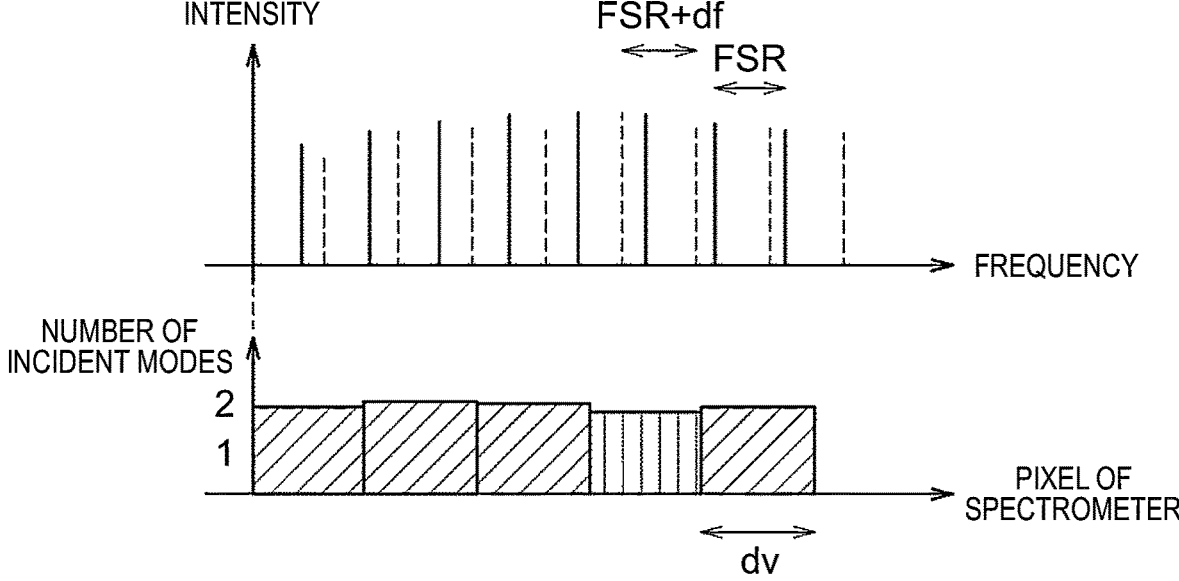
FIG. 6B is a diagram illustrating averaging with modulation of mode interval FSR.

FIG. 6B illustrates an outline of the prevention.

For example, when mode interval FSR is 10 GHz and LC=15 mm, the center wavelength of 1310 nm corresponds to the 22900th mode counted from 0 Hz. Thus, when mode interval FSR is changed to FSR+df during the exposure time, the wavelength that is the 22900th mode moves by 22900×df. As a result, the pixel of the spectrometer on which each mode is incident changes, and thus the quantized state as illustrated in FIG. 6A can be eliminated.

As a method for scanning mode interval FSR, cavity length LC may be directly modulated by a linear motion mechanism such as a piezo element in Fabry-Perot filter 212 using air gap 217, or a vibration mechanism, or temperature modulation to a fiber may be used particularly in the first modification of optical comb generation filter 205 using a fiber.

Since the contrast of the interference fringes themselves is not impaired, modulation width df of the mode preferably changes by about 0.5 pixels during the exposure time. A change in the optical frequency corresponding to this is about 8.5 GHZ, and a change amount of mode interval FSR that realizes a shift of 8.5 GHz at a center wavelength of 1310 nm is expressed as follows.

$$8.5 \text{ GHz}/22900 = 370 \text{ kHz} \tag{5}$$

This corresponds to a shift of about 1 μm in a 15 mm cavity.

As the modulation waveform of the mode, for example, when a periodic method in which mode interval FSR changes in a sinusoidal shape or a sawtooth shape with respect to time is used, there is a concern that sufficient averaging may not be performed due to the correlation with the exposure time of detector array 210, and thus, it is preferable to perform random modulation. As a mechanism for randomly modulating the mode interval, for example, a mirror on one side of the mirror pair can be randomly displaced by the piezoelectric element, or a mirror on one side or both sides of the mirror pair can be mechanically vibrated.

According to the first exemplary embodiment, the light adjusted at equal frequency intervals by optical comb generation filter 205 is divided into measurement light and reference light by reference surface 208 of an example of the light division unit disposed at a position away from measurement head 207 toward the measurement target side, and the interference light in which the reflection light of the measurement light from measurement target W and the reference light are multiplexed is detected by detector array 210 of an example of the interference light detection unit, whereby distance L to measurement target W can be made farther than measurable range LD in the common path optical system.

Second Exemplary Embodiment

Figure 7:
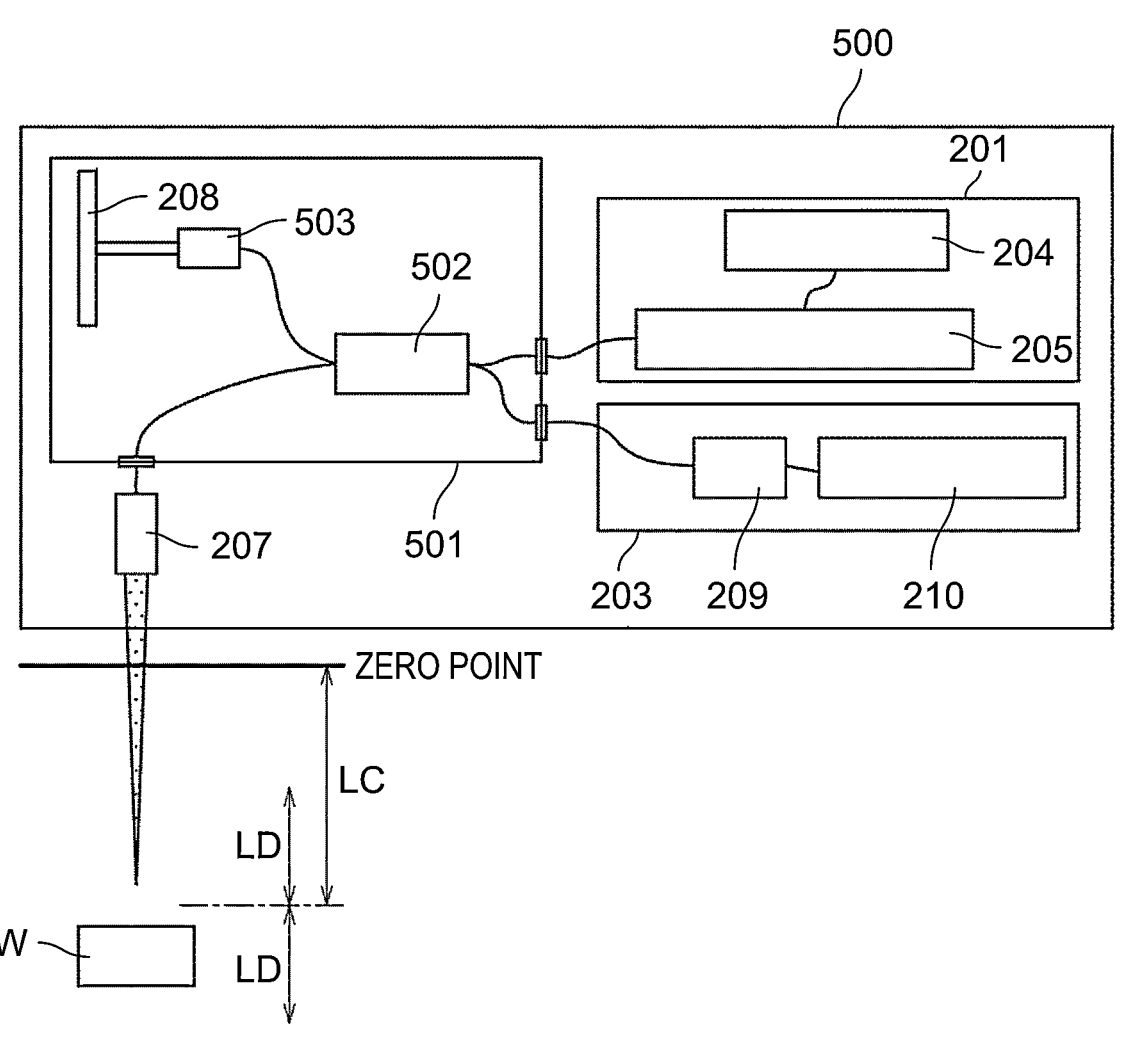
FIG. 7 is a diagram illustrating an overall configuration of an SD-OCT device according to a second exemplary embodiment.

A second exemplary embodiment will be described with reference to FIG. 7 illustrating an overall configuration of SD-OCT device 500 according to the second exemplary embodiment. The same components as those of the first exemplary embodiment described in FIG. 1 are denoted by the same reference numerals, and the description thereof will be omitted.

Optical fiber interferometer 501 according to the present second exemplary embodiment is not a common path interferometer but a Michelson interferometer, and reference surface 208 is not disposed at a position away from measurement head 207 toward measurement target W but is disposed at an independent position not passing through measurement head 207 branched by the coupler 502. Thus, the second exemplary embodiment has an advantage that the position of the zero point can be freely determined as compared with the first exemplary embodiment. Here, an example of the light division unit is made to function not by reference surface 208 but by coupler 502.

In optical fiber interferometer 501 instead of optical fiber interferometer 202, a light emitting port of optical frequency comb light source 201 is connected to a first light receiving port of two light receiving ports of optical fiber interferometer 501, and is divided into measurement light and reference light by coupler 502. The light sending port of coupler 502 is connected to measurement head 207 outside optical fiber interferometer 501 as signal light, and is also connected to collimator lens 503 that emits light to reference surface 208 as reference light.

The reference light enters coupler 502 through collimator lens 503 after being reflected by reference surface 208, and enters spectrometer 203 from the second light receiving port of the two light receiving ports of optical fiber interferometer 501.

On the other hand, the measurement light is emitted from measurement head 207 to measurement target W, enters coupler 502 from measurement head 207 through reflection or scattering at measurement target W, and enters spectrometer 203 from the second light receiving port of optical fiber interferometer 501.

In optical fiber interferometer 501, a point at which the signal optical path length of the measurement light coincides with the reference optical path length of the reference light, that is, a zero point is illustrated in FIG. 7. The position of the zero point in the second exemplary embodiment can be freely changed, for example, by changing the distance between collimator lens 503 and reference surface 208 or the distance in the fiber between coupler 502 and collimator lens 503, and can also be disposed between measurement head 207 and coupler 502, for example.

Measurement target W is within a range from a distance obtained by subtracting measurable range LD determined by optical frequency resolution dv of spectrometer 203 from a position of LC×n±LD from the zero point, that is, an integer multiple of a value obtained by multiplying the reciprocal of mode interval FSR of optical comb generation filter 205 by light speed c, to a distance obtained by adding measurable range LD to the value.

In this manner, according to the second exemplary embodiment, the light adjusted at equal frequency intervals by optical comb generation filter 205 is divided into measurement light and reference light by coupler 502 as an example of light division unit, the distance from the zero point to measurement target W is set within the range of the distance obtained by adding or subtracting measurable range LD determined by optical frequency resolution dv of detector array 210 as an example of the interference light detection unit to or from a value that is an integer multiple n of a value obtained by multiplying the reciprocal of mode interval FSR of optical comb generation filter 205 by light speed c, and the interference light in which the reflected light from measurement target W and the reference light are multiplexed is detected by detector array 210 as an example of the interference light detection unit. With this configuration, distance L to measurement target W can be made farther than measurable range LD.

Reference surface 208 in the second exemplary embodiment does not have to transmit light, and it may be a mirror.

When any exemplary embodiments or modifications are appropriately combined in the various exemplary embodiments or modifications described above, the effect possessed by each of them can be achieved. Additionally, the exemplary embodiments can be combined with each other, and the examples can be combined with each other, and then features in the different exemplary embodiments, or in the different examples, also can be combined with each other.

As described above, according to the optical interference measurement device according to an aspect of the present invention, the light adjusted at equal frequency intervals by the optical comb generation filter is divided into measurement light and reference light by a light division unit, the distance from the zero point to the measurement target is set within the range of the distance obtained by adding or subtracting the measurable range determined by the optical frequency resolution of the interference light detection unit to or from the value that is an integer multiple of the value obtained by multiplying the reciprocal of the mode interval of the optical comb generation filter by the light speed, and the interference light in which the reflected light from the measurement target of the measurement light and the reference light are multiplexed is detected by the interference light detection unit. With this configuration, the distance to the measurement target can be made farther than the measurable range.

INDUSTRIAL APPLICABILITY

The optical interference measurement device according to the above aspect of the present invention has a feature of enabling measurement over a long distance with high accuracy, and the device can also be applied to applications such as precision measurement in an industrial field.

REFERENCE MARKS IN THE DRAWINGS 10 interferometer
12 light source
30 collimator
40 spectroscopic device
200 SD-OCT device
201 optical frequency comb light source
202 optical fiber interferometer
203 spectrometer
204 low coherence light source
205 optical comb generation filter
206 coupler
207 measurement head
208 reference surface
209 diffraction grating
210 detector array
211 pair of half mirrors
212 Fabry-Perot filter
213 intensity adjustment mechanism
217 air gap
300 spectrum of low coherence light source
301 transmittance spectrum of optical comb generation filter
302 output spectrum 400 resonator coupler
401 first input port
402 first output port
403 second output port
404 time delay fiber
405 second input port
500 SD-OCT device
501 optical fiber interferometer
502 coupler
503 collimator lens
LD measurable range
L distance to measurement target W
W measurement target
dv frequency resolution
LC cavity length
FSR mode interval
FW mode width
R reflectance

The invention claimed is:

1. An optical interference measurement device comprising:

an optical division unit that divides light into measurement light and reference light, the light being emitted from a low coherence light source and adjusted at equal frequency intervals; and an interference light detection unit that detects interference light in which reflected light from a measurement target and the reference light are multiplexed, wherein a distance from a zero point to the measurement target is set within a range from a first distance to a second distance, the zero point is a point at which a signal optical path length of signal light that is the measurement light coincides with a reference optical path length of the reference light, the first distance is obtained by subtracting a measurable range determined by an optical frequency resolution of the interference light detection unit from a first value that is an integer multiple of a second value obtained by multiplying a reciprocal of a mode interval of an optical comb generation filter by a light speed, and the second distance is obtained by adding the measurable range to the first value.

2. The optical interference measurement device according to claim 1, wherein the low coherence light source is any one of a super luminescent diode, an ultrashort pulse laser, and a super continuum light source, and light emitted from the light source is the low coherence light.

3. The optical interference measurement device according to claim 1, wherein the light division unit is disposed between the measurement target and a measurement head.

4. The optical interference measurement device according to claim 1, further comprising an intensity adjustment mechanism that adjusts intensity of signal light that is the measurement light, wherein the intensity adjustment mechanism is disposed at a position at a distance of a half of the value obtained by multiplying the reciprocal of the mode interval of the optical comb generation filter by the light speed from the zero point.

5. The optical interference measurement device according to claim 4, wherein the optical comb generation filter is a Fabry-Perot filter with a range of finesse of 2 to 20, and the optical comb generation filter is a mechanism in which a mode interval thereof is randomly modulated.

* * * * *